US012516625B2

(12) United States Patent
Brand et al.

(10) Patent No.: US 12,516,625 B2
(45) Date of Patent: Jan. 6, 2026

(54) ENGINE PROTECTION COVER DEVICE FOR AIRTIGHT SEALING AN ENGINE OF AN AIRCRAFT OR SPACECRAFT

(71) Applicant: Airbus Operations GmbH, Hamburg (DE)

(72) Inventors: Burkhard Brand, Agathenburg (DE); Andreas Noeske, Bremen (DE); Stefan Binz, Hamburg (DE); Nico Sonntag, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/985,499

(22) Filed: Dec. 18, 2024

(65) Prior Publication Data
US 2025/0198329 A1    Jun. 19, 2025

(30) Foreign Application Priority Data
Dec. 19, 2023   (EP) ..................................... 23218106

(51) Int. Cl.
*F02C 7/055*    (2006.01)
*B64F 1/00*    (2006.01)

(52) U.S. Cl.
CPC .............. *F02C 7/055* (2013.01); *B64F 1/005* (2013.01)

(58) Field of Classification Search
CPC . F02C 7/04; F02C 7/055; B64F 1/005; B64D 33/02; B64D 33/022; B64D 33/0273; B64D 33/0286
See application file for complete search history.

(56) References Cited

U.S. PATENT DOCUMENTS

| 2,744,382 | A | | 5/1956 | Benjamin | |
|---|---|---|---|---|---|
| 3,000,533 | A | | 9/1961 | Jodock | |
| 3,646,980 | A | * | 3/1972 | Peterson | B64F 1/005 244/129.4 |
| 5,143,321 | A | | 9/1992 | Jackson | |
| 6,871,819 | B2 | * | 3/2005 | Garric | F02C 7/04 244/121 |
| 8,651,415 | B1 | * | 2/2014 | Sparks | B64D 45/00 244/121 |
| 9,446,857 | B2 | * | 9/2016 | Sparks | B64F 1/005 |
| 12,214,901 | B2 | * | 2/2025 | Violette | B64F 1/005 |

(Continued)

FOREIGN PATENT DOCUMENTS

| CN | 105564667 A | 5/2016 |
|---|---|---|
| DE | 102019212436 A1 | 10/2020 |

(Continued)

OTHER PUBLICATIONS

Extended European Search Report for EP Application No. 23218106.5, dated Jun. 14, 2024, 10 pages.

*Primary Examiner* — William H Rodriguez
(74) *Attorney, Agent, or Firm* — KDW Firm PLLC

(57) ABSTRACT

An engine protection cover device for airtight sealing an engine of an aircraft or spacecraft includes an air intake cover being inflatable to correspond to the internal dimension of the air intake for airtight sealing the same, wherein the air intake cover includes an airtight sealable access opening for attaching or passing through an air dryer for drying the air inside the engine. An aircraft or spacecraft is disclosed with such an engine protection cover device.

20 Claims, 3 Drawing Sheets

(56) References Cited

U.S. PATENT DOCUMENTS

| | | | |
|---|---|---|---|
| 2014/0008497 A1 | 1/2014 | Alexander | |
| 2014/0245665 A1* | 9/2014 | Sparks | B64F 1/005 49/34 |
| 2015/0089879 A1 | 4/2015 | Sparks | |
| 2019/0376491 A1* | 12/2019 | Diget | F03D 13/10 |
| 2023/0079530 A1* | 3/2023 | Violette | C08F 14/26 150/157 |
| 2024/0190583 A1* | 6/2024 | Labas | B64F 1/005 |
| 2025/0121955 A1* | 4/2025 | Griffin, Jr. | B64F 1/005 |

FOREIGN PATENT DOCUMENTS

| | | | | |
|---|---|---|---|---|
| EP | 2615035 A2 * | 7/2013 | | B64F 1/005 |
| WO | WO-2022032893 A1 * | 2/2022 | | B64D 27/26 |
| WO | 2024083722 A1 | 4/2024 | | |

* cited by examiner

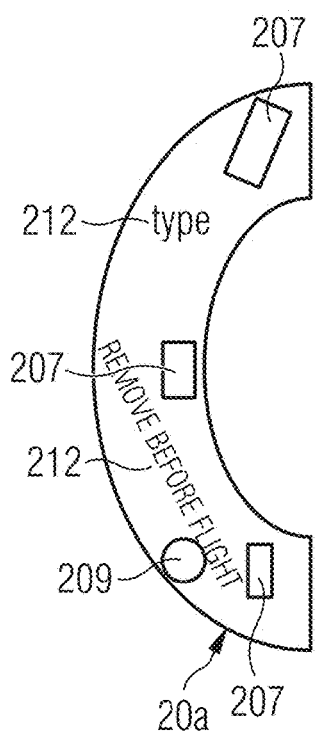
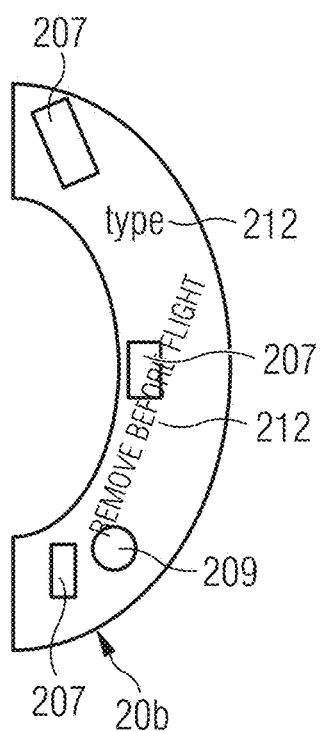
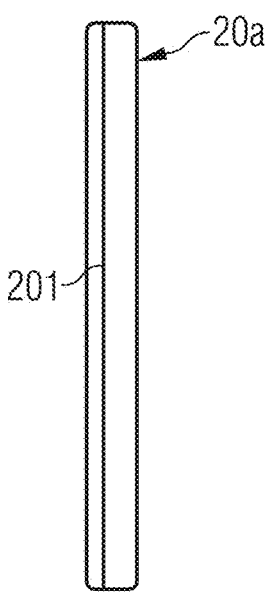
Fig. 4          Fig. 5
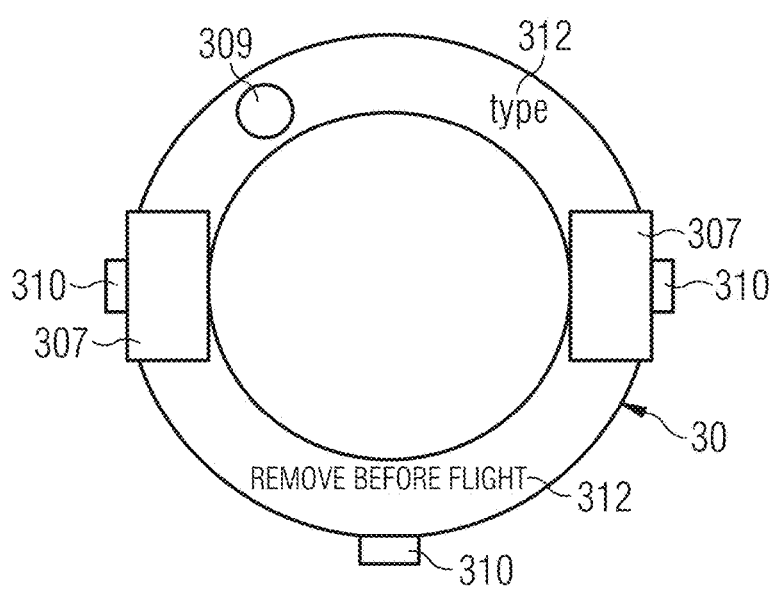
Fig. 6

ENGINE PROTECTION COVER DEVICE FOR AIRTIGHT SEALING AN ENGINE OF AN AIRCRAFT OR SPACECRAFT

TECHNICAL FIELD

The disclosure herein relates to an engine protection cover device for airtight sealing of an aircraft or spacecraft. The disclosure herein furthermore relates to an aircraft or spacecraft with an engine protection cover device of this kind.

Although it can be used in many different applications, the disclosure herein and the problem underlying the disclosure herein are explained in detail with reference to a passenger aircraft. However, the devices described can likewise be employed in different vehicles and in all sectors of the transport industry, e.g. for road vehicles, rail vehicles, aircraft or watercraft.

BACKGROUND

Engines of an aircraft or spacecraft have to be protected against foreign object debris (FOD) and corrosion due to high moisture, in particular during daily aircraft handling operations, during short term or long term storage or during shipment of engines from a manufacturer to an aircraft builder, MRO service providers or aircraft operators. It is known to protect the engine intake or inlet and the engine exhaust or outlet with specific covers, in particular PVC tarpaulin covers or inflatable plugs or the same. However, with these known covers, it is sometimes difficult to control or reduce the moisture or air humidity inside the engine.

SUMMARY

Given this background situation, it is the underlying object of the disclosure herein to provide an engine protection cover for a protection against foreign object debris or damage and for enhancing the possibility of controlling and reducing air humidity inside the engine during storage. Furthermore, it is an object to provide an engine protection cover being able to be customized to different types of engines in an easy manner.

According to the disclosure herein this object is achieved by an engine protection cover device and by an aircraft or spacecraft disclosed herein. Accordingly, an engine protection cover device is provided for airtight sealing an engine of an aircraft or spacecraft. This engine protection cover device comprises an air intake cover being inflatable to correspond to the internal dimension of the air intake for airtight sealing the same, wherein the air intake cover comprises an airtight sealable access opening for attaching or passing through an air dryer for drying the air inside the engine. The exact dimension of the air intake cover can be adapted to the respective type of engine.

By such an air intake cover it is advantageously possible to seal the intake of the engine in an airtight manner, wherein a respective dryer can be connected to the access opening or can be passed through the access opening and inserted into the inside of the engine for reducing and controlling the air humidity inside the engine during daily aircraft handling operations or shipments of engines, or in case of short term or long term storage without detaching, moving or turning the cover.

Advantageous embodiments and developments will be found in the additional dependent claims and in the description with reference to the figures.

According to an embodiment, the access opening is airtight sealed during non-use by a corresponding airtight sealing hatch, lid, flap or the same. Hence, the access opening is advantageously sealed in an airtight manner in a non-use state by the closed hatch, for example by a corresponding locking device. On the other hand, in an open state of the hatch an air dryer can be connected to the access opening or can be introduced to the inside of the engine by passing it through the access opening. After such a drying step, the access opening can be closed again in an airtight sealing manner such that the complete air intake cover seals the air intake of the engine in an airtight sealing manner.

According to a further embodiment, the access opening comprises a connector for connecting a drying tube of a drying device, in particular of an active humidity controller or the same, wherein the connector is in particular designed as a bayonet lock or the same. Hence, in particular during a long storage, the humidity inside the engine can be controlled by easily connecting a drying device through the access opening of the air intake cover without any operator efforts. Furthermore, by using a bayonet lock, a tube of the drying device can be connected to the access opening in a simple and secured manner.

According to a further embodiment, the air intake cover comprises a friction protector at the outside of the air intake cover in the vicinity of the access opening, in particular below the access opening, for protecting the surface of the engine against damage during the respective drying process, wherein for example the friction protector is formed as a neoprene flap, carpet or the same. Hence, by providing such a neoprene flap, the surface of the engine being in contact with for example the tube of a drying device is advantageously protected against friction damage or the same. The neoprene flap might be stored in a respective storage bag or the same during non-use being also part of the air intake cover.

According to a further embodiment, the air intake cover comprises a carrying device, in particular a mesh bag or the same, being positioned at the backside of the air intake cover behind the access opening for carrying an inserted air dryer or desiccant, for example a desiccant bag or the same. Thus, the desiccant bags are supported and stored in a predetermined position without the risk of damaging engine parts by being pushed into the engine.

According to a further embodiment, the mesh bag comprises a continuous and resistant bottom for carrying the air dryer or desiccant without coming into direct contact with parts of the engine. Hence, by such a continuous and resistant bottom the desiccant bags are not able to damage the surface of engine parts due to a direct contact with these parts. For example, a negative chemical reaction can thus be avoided advantageously.

According to a further embodiment, the air intake cover comprises several handles for correctly handling and positioning the air intake cover, wherein in particular two handles are positioned about at the horizontal center line symmetrical to each other. Thus, the air intake cover can advantageously be positioned and press fitted in an efficient manner due to the fact that the handles are centered. Additional handles at further positions are also possible in order to achieve a suitable press-fit and position of the air intake cover.

According to a further embodiment, the air intake cover comprises at least one safety line, for example a safety pin strap or the same, for attaching the air intake cover to an external surface of the engine, wherein the at least one safety line is for example stored during non-use in a respective stow and/or protection device being provided at the front side of the air intake cover. Thus, a foreign object debris (FOD) is avoided on the runway in case of an unintended deflation of the cover when the cover is installed on the engine.

According to a further embodiment, the engine protection cover device further comprises an air exhaust cover, wherein the air exhaust cover comprises a C-ducts cover, an exhaust nozzle cover and/or a nozzle end cap. Thus, the engine is protected also on the exhaust or outlet side such that no foreign objects or humidity can enter the engine neither from the intake nor from the exhaust side. Hence, the engine is completely covered and sealed in an advantageous manner.

According to a further embodiment, the C-ducts cover comprises two C-ducts cover parts being also inflatable to correspond to the internal dimensions of the two engine C-ducts, respectively, for airtight sealing the same. The exact dimension of the two C-ducts cover parts can be adapted to the respective type of engine. Thus, the C-ducts cover is adapted to the specific shape of the C-ducts also taking respective webs or protrusions between the C-ducts into consideration.

According to a further embodiment, the exhaust nozzle cover is also inflatable to correspond to the internal dimensions of the engine nozzle for airtight sealing the same. Thus, the exhaust nozzle cover can be press fitted into the respective exhaust nozzle opening of the engine in an airtight sealed manner. The exact dimension of the exhaust nozzle cover can be adapted to the respective type of engine.

According to a further embodiment, each C-ducts cover part and/or the exhaust nozzle cover comprise one or more handles at predetermined areas thereof, respectively, in particular at an upper area, an area of the horizontal center line, a lower area or the same. Hence, the installation handling quality of the single covers are improved and the time for installation is advantageously reduced.

According to a further embodiment, the two C-ducts cover parts are designed as a press fit, in particular in the upper and/or lower interface areas, in order to provide a closed or almost closed configuration. Thus, also in the areas of the interfaces of the two C-ducts cover parts the entrance of moisture from the outside to the inside of the engine can advantageously be prevented in order to keep the humidity inside the engine low. Optionally, an additional moisture barrier is provided in particular at the lower interface of the two C-ducts cover parts.

According to a further embodiment, the nozzle end cap, preferably made of a PVC material or the same, is attached to the exhaust nozzle cover by one or more safety belts being positioned about in the horizontal center line thereof, in particular by two safety belts. In case of two safety belts, these safety belts are advantageously positioned symmetrical to each other close to the horizontal center line of the nozzle end cap in order to achieve an optimized holding stability.

According to a further embodiment, the air intake cover, the C-ducts cover parts and/or the exhaust nozzle cover comprise a valve, in particular at the respective front side, and a safety relief valve, in particular at the respective rear side. Thus, the respective covers cannot be inflated with a too high pressure as a protection against bursting or damaging engine parts. Furthermore, the valves are positioned at an advantageous position in order not to damage parts of the engine and in order to facilitate the handling of inflation.

According to a further embodiment, the air intake cover and/or the air exhaust cover comprise on the respective front side an information labelling, for example an information marking, a caution sign, an engine type specific lettering, a position marking, an introduction marking or the same. Hence, the handling quality is advantageously enhanced for example by providing an introduction marking for a maximum allowable insert or depth positioning of the cover to avoid a damage of the engine or to avoid that desiccant bags are being pushed into the engine.

According to a further embodiment, the air intake cover and/or the air exhaust cover, in particular the C-ducts cover parts, comprise one or more distance positioning indicator markings, flappers, flaps or the same, in particular being located at the outer peripheral area of the respective cover. These markings enhance advantageously the introduction quality of the respective cover such that the cover is not pushed too far into the engine, does not damage the engine, does not push desiccant bags into the engine and is not positioned above sensitive engine parts.

Furthermore, an aircraft or spacecraft is provided comprising an engine protection cover device according to one or more of the above mentioned embodiments.

The above embodiments can be combined in any desired manner, as and when appropriate. Further possible embodiments, developments and implementations of the disclosure herein also include combinations, not explicitly mentioned, of features of the disclosure herein that are described above or below with reference to the embodiment examples. In this context, a person skilled in the art will, in particular, also add individual aspects as improvements or supplementary features to the respective basic form of the disclosure herein.

BRIEF DESCRIPTION OF THE DRAWINGS

The disclosure herein is explained in more detail below with reference to the embodiments shown in the schematic figures of the drawing. Here:

FIG. 4 shows a front view of a C-ducts cover of an air exhaust cover according to a preferred embodiment of the disclosure herein;

FIG. 5 shows a left side view of the C-ducts cover from FIG. 4;

FIG. 6 shows a front view of an exhaust nozzle cover of an air exhaust cover according to a preferred embodiment of the disclosure herein.

Figure 1:
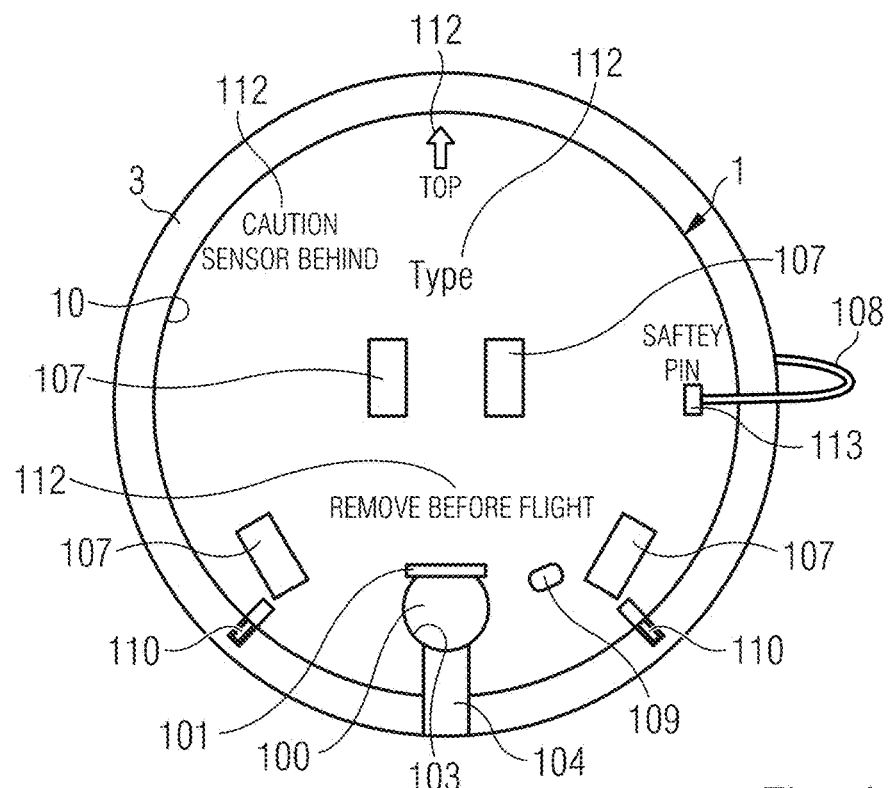
FIG. 1 shows a front view of an air intake cover according to a preferred embodiment of the disclosure herein.

The attached figures are intended to impart greater understanding of the embodiments of the disclosure herein. They illustrate embodiments and, in combination with the description, serve to explain principles and concepts of the disclosure herein. Other embodiments and many of the stated advantageous will become apparent when viewing the drawings. The elements of the drawings are not necessarily shown to scale relative to one another.

In the figures of the drawing, identical, functionally identical and identically acting elements, features and components are each provided with the same reference signs, unless stated otherwise.

DETAILED DESCRIPTION

FIG. 1 shows a front view of an air intake cover 2 of an engine protection cover device according to a preferred embodiment of the disclosure herein being installed into the intake opening of an air intake 10 of an example engine 3. The air intake cover 1 comprises a disc shape, in particular round or oval, which is adapted in an inflated condition to the internal dimension of the intake opening of the air intake 10 of the specific engine 3 of an aircraft or spacecraft in order to be press fitted into the intake opening. The air intake cover 1 is preferably installed inside the skin area of the air intake 10 of the engine 3. The air intake cover 1 consists preferably of a PE, AST/ASA material, epoxy, carbon or any other suitable material which is resistant and inflatable.

As can be seen in FIG. 1, the air intake cover 1 comprises several handles 107 being positioned at predetermined areas of the air intake cover 1. Advantageously, at least two handles 107 are placed about at the horizontal center line thereof symmetrical to each other. This improves the handling quality of the air intake cover 1. It is obvious to a person skilled in the art that the number and the position of handles can differ from the preferred embodiment as illustrated in FIG. 1.

Furthermore, the air intake cover 1 comprises a safety line 108 or safety pin strap which is attachable to a respective attachment structure of the air intake 10. This advantageously aims to avoid a foreign object debris on the runway in case of an unintended deflation of the air intake cover 1 in case it is installed on the engine. The safety line 108 can be stored in a corresponding pocket 113 or the same during non-use of the air intake cover 1.

Additionally, the air intake cover 1 comprises a valve 109. The valve 109 is advantageously positioned at the front side of the air intake cover 1 in order not to come in contact with a surface of the engine and in order to provide an easy access for an inflation tube or inflation device. The valve 109 can be designed as a safety relief valve or an additional pressure relief mechanism can be provided. Preferably, a pressure relief threshold of about 5 to 7 psi, in particular of about 6.5 psi, is provided in order to protect the air intake cover 1 against bursting and the contacted surface of the engine 3 against damage. It is obvious to a skilled person that this threshold can be reduced or raised and can be adapted to the specific needs.

Further, the air intake cover 1 according to the disclosure herein preferably comprises several distance positioning flaps 110, for example two distance positioning flaps 110 being positioned at about 4 and 8 o'clock positions as illustrated in FIG. 1. These distance positioning flaps 110 indicate the correct distance from for example a respective rivet line of the air intake 10 of the engine in order to address specific engineering requirements to avoid a damage to the nacelle structure due to the press fit configuration of the air intake cover 1. For example, these flappers 110 can be configured as hook-and-look type (Velcro) fasteners in order to store the flappers 110 in an appropriate manner in case of non-use.

As can also be seen in FIG. 1, the air intake cover 1 preferably comprises one or more specific information labellings 112. These information labellings 112 give information for example regarding the orientation of the intake cover 1, namely for example which part is the top of the air intake cover 1, for example by an arrow or a lettering, regarding the engine type to address the use of the right cover set for the correct engine type due to different sizing of different engines, regarding specific caution signs, for example "to be removed before flight", "sensor behind", "safety pin stow location" or the same in order to avoid damages to the engine or specific engine parts, or regarding any other useful information.

Furthermore, the air intake cover 1 is on the front side preferably designed in a signal colour, for example in red, in order to indicate to the operator that the air intake cover 1 is not part of the engine and has to be removed before the use of the engine.

Figure 2:
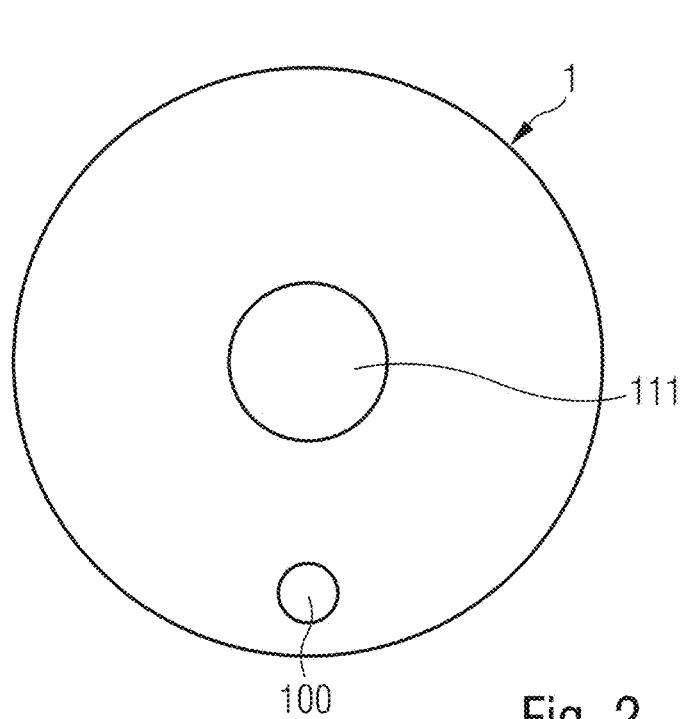
FIG. 2 shows a rear view of the air intake cover from FIG. 1.
Figure 3:
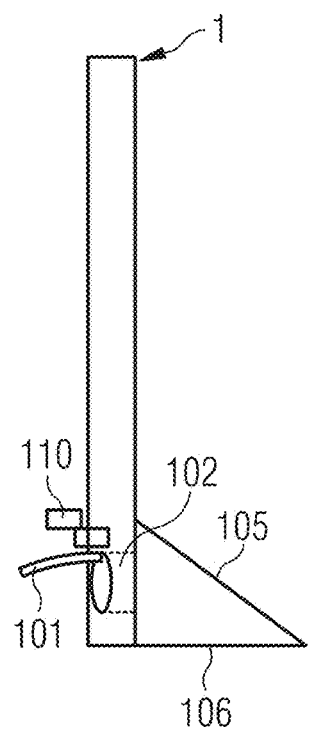
FIG. 3 shows a left side view of the air intake cover from FIG. 1 and FIG. 2.

As can also be seen in FIG. 1 in combination with FIGS. 2 and 3, which show a rear view of the air intake cover 1 from FIG. 1 and a left side view of the air intake cover 1 from FIG. 1, the air intake cover 1 of the disclosure herein comprises an access opening 100 being airtight sealable by a corresponding hatch 101. Preferably, the hatch 101 is lockable by a respective locking device in a closed position in which the hatch 101 closes the access opening 100 completely in an airtight sealed manner. The access opening 100 serves on the one hand for attaching a tube of a respective dryer (not shown), for example by bayonet lock of the same, in order to provide the possibility of connecting an air drying device to the access opening 100 of the air intake cover 1. For example, the air drying device can be designed as an active humidity controller controlling the humidity content inside the engine 3 during storage, in particular during a long term storage.

On the other hand, the access opening 100 of the air intake cover 1 aims to enable access to the inside of the engine for placing specific desiccant materials, in particular desiccant bags, to the inside of the engine or for replacing desiccant materials after use without the need of removing or shifting the air intake cover 1. Thus, the operation time is highly decreased advantageously.

As illustrated in FIG. 3, preferably a mesh bag 105 is attached to the backside of the air intake cover 1 at the position of the access opening 100 in order to store the desiccant bags to be introduced via the access opening 100. In order to protect the surface of specific parts of the engine 3 against contacting desiccant materials, the mesh bag 105 comprises a continuous and resistant bottom side 106 for carrying the desiccant bags without coming into direct contact with parts of the engine.

For example, the access opening 100, the corresponding hatch 101 and/or the mesh bag 105 can be designed in a round, oval, rectangular cross-sectional shape or the same. It is obvious to a person skilled in the art that the shapes and geometries of the access opening 100, the hatch 101 as well as of the mesh bag 105 and all other parts can differ from the embodiment illustrated in FIG. 1 and can be designed in any other suitable shape and geometry.

The air intake cover 1 further preferably comprises a friction protector 104, for example being designed as a neoprene flap or the same, in order to protect the surface of the air intake seal against friction damage by the connected tube of an air drying device. The friction protection flap 104 can be stored in a respective pocket (not shown) or the same during non-use.

As visible in FIG. 2, the air intake cover 1 preferably further comprises an additional reinforcement layer or patch 111 at a predetermined location for protecting the air intake cover 1 against damages during contact with engine parts during the installation process. The additional patch or reinforcement layer 111 is preferably positioned in the center of the air intake cover 1 at the backside thereof in order to avoid damages caused by the inlet cone of the engine 3 during the installation process. It is obvious to a person skilled in the art that further reinforcement layers or patches can be placed at any other suitable positions on the backside of the air intake cover 1.

For the sealing process, a suitable air intake cover 1 corresponding to the specific engine type, which has to be sealed, is selected and is placed in a deflated condition into the opening of the air intake 10 in a correct orientation and alignment. Afterwards, a pump is connected to the valve 109 and the air intake cover 1 is inflated at least partially in order to press fit the air intake cover 1 into the opening of the air intake 10. During alignment, the distance positioning flaps 110 are used as a support to place the air intake cover 1 in the correct position in longitudinal direction of the engine 3. In order to support installation process, the operator uses the respective handles 107 accordingly. After the installation, in the closed condition of the hatch 101, the access opening 100 is airtight sealed and the air intake cover 1 completely seals the air intake 10 in an airtight manner. In order to control or reduce the moisture and humidity inside the engine 3, desiccant bags or the same can be introduced via the access opening 100 to the mesh bag 105 at the inside of the engine 3. Additionally or optionally, a respective air dryer, in particular an active humidity controller, can be connected by a respective tube or pipe to the access opening 100 by a bayonet lock or the same.

The engine protection cover device preferably additionally comprises an air exhaust cover 2 for airtight sealing the air exhaust 11 of the engine 3 in order to create an completely airtight sealed engine 3 and an engine being completely protected against foreign object debris. In the following, the air exhaust cover 2 will be described in more detail taking FIGS. 4 to 7 into consideration.

The air exhaust cover 2 preferably exists of three cover parts, namely a C-ducts cover comprising two C-ducts cover parts 20a and 20b, an exhaust nozzle cover 30 and a nozzle end cap 40. The two C-ducts cover parts 20a and 20b are illustrated in FIG. 4 in a front view, wherein FIG. 5 illustrates a left side view thereof. The two C-ducts cover parts 20a and 20b can be designed as disconnected single parts or a specific connection line or flap might exist between them, for example in the lower area thereof. Analogue to the air intake cover 1, the two C-ducts cover parts 20a, 20b are made from an inflatable and resistant material like preferably a PE material, AST/ASA material, epoxy, carbon or any other suitable material which is resistant and inflatable.

Further, the two C-ducts cover parts 20a and 20b are formed with about a half ring shape being adapted to the C-ducts dimensions of the respective engine type being sealed, respectively. Respective rips or parts of the C-ducts of the engine 3 and interfaces thereof are taken into consideration for a suitable shape of the two C-ducts cover parts 20a, 20b such that a press fit into the two C-ducts of the engine 3 is provided.

Further, the two C-ducts cover parts 20a and 20b comprise several handles 207, wherein at least one handle 207 is positioned around the horizontal center line and a further handle 207 is positioned in the upper area of each C-ducts cover part 20a and 20b, respectively, as illustrated in FIG. 4. It is obvious for a person skilled in the art that the number and positions of the handles can be adapted to the needs of the installation operator such that an installation can be conducted with the upmost quality and time efficiency.

Furthermore, each C-ducts cover part 20a, 20b comprises a valve 209, wherein analogue to the air intake cover 1 the valve 209 can be formed as a safety relief valve or the same. A pressure relief threshold can be set to about 3 to 5 psi, in particular to about 3.5 psi. It is obvious to a person skilled in the art that this threshold can vary depending on the specific needs and in order to fulfil the requirements of specific seating performances. Advantageously, the respective valves 209 are positioned at lower front side positions, for example at 5 and 7 o'clock positions in order to avoid cosmetic damage to the engine surrounding area potentially caused by an inflation tube or the same.

Each C-ducts cover part 20a, 20b further comprises one or more information labellings 212, wherein in this respect it is referred to the information labellings 112 of above described air intake cover 1, since the above-mentioned statements regarding the information labellings can be transferred to the present C-ducts cover parts 20a, 20b in an analogous manner.

Also the above mentioned signal colour red can be used for all covers of the air exhaust cover 2, namely for the C-ducts cover parts 20a, 20b, for the exhaust nozzle cover 30 as well as for the nozzle end cap 40. Again it is referred to the explanations above in respect to the air intake cover 1.

Further, as illustrated in FIG. 5 in a left side view, each C-ducts cover part 20a and 20b comprises a position marking 201, for example in form of a coloured marking line, indicating a proper installation position of each C-ducts cover part 20a, 20b. These position markings 201 are provided for example on the outer circumference in a radial direction of each C-ducts cover part 20a, 20b.

Additionally, each C-ducts cover part 20a, 20b comprises a press fit design in particular in the upper and lower areas of the intersections of the two C-ducts cover parts 20a, 20b in order to provide a closed configuration and to avoid small gaps on these interface areas to the nacelle and to improve the engine preservation efficiency. Optionally, an additional moisture barrier can be provided, in particular at the lower interface area of the two C-ducts cover parts 20a, 20b.

With respect to FIG. 6, an exhaust nozzle cover 30 of the preferred embodiment of the disclosure herein is explained. The exhaust nozzle cover 30 is shaped in form of a ring and is adapted to the shape of a corresponding exhaust nozzle of a specific engine type being sealed. The exhaust nozzle cover 30 is also made from an inflatable material and comprises a valve 309, in particular at the front side of the exhaust nozzle cover 30. Analogue to the air intake cover 1, the exhaust nozzle cover 30 is made from an inflatable and resistant material like preferably a PE material, AST/ASA material, epoxy, carbon or any other suitable material which is resistant and inflatable. In this respect it is again referred to the explanations above in respect to the air intake cover 1 and the two C-ducts cover parts 20a, 20b.

The exhaust nozzle cover 30 also comprises one or more information labellings 312. Again it is referred to the explanations above in respect to the information labellings 112 of air intake cover 1 as well as to the information labellings 212 of the C-ducts cover parts 20a, 20b.

The exhaust nozzle cover 30 preferably comprises several handles 307, wherein two handles 307 are preferably positioned at 3 o'clock position and 9 o'clock positions as illustrated in FIG. 6, in order to improve the installation process as well as a safety connection which will be described further below.

The exhaust nozzle cover 30 further comprises one or more distance positioning flaps 310, for example three positioning flaps at 3 o'clock, 6 o'clock and 9 o'clock positions, in order to indicate the maximum allowable positioning depth of the exhaust nozzle cover 30 to avoid that for example desiccant bags are being pushed into the engine during installation of the exhaust nozzle cover 30.

Furthermore, the exhaust nozzle cover 30 comprises a valve 309, wherein analogue to the air intake cover 1 the valve 309 can be formed as a safety relief valve or the same. A pressure relief threshold can be set to about 3 to 5 psi, in particular to about 3.5 psi.

The air exhaust cover 2 further comprises a nozzle end cap 40, which is preferable made of a PVC material or the same. The nozzle end cap 40 is for example made as a tarpaulin cover being placed over the end nozzle of the engine 3. The nozzle end cap 40 has the shape of the respective end nozzle of the corresponding engine 3 being sealed.

Figure 7:
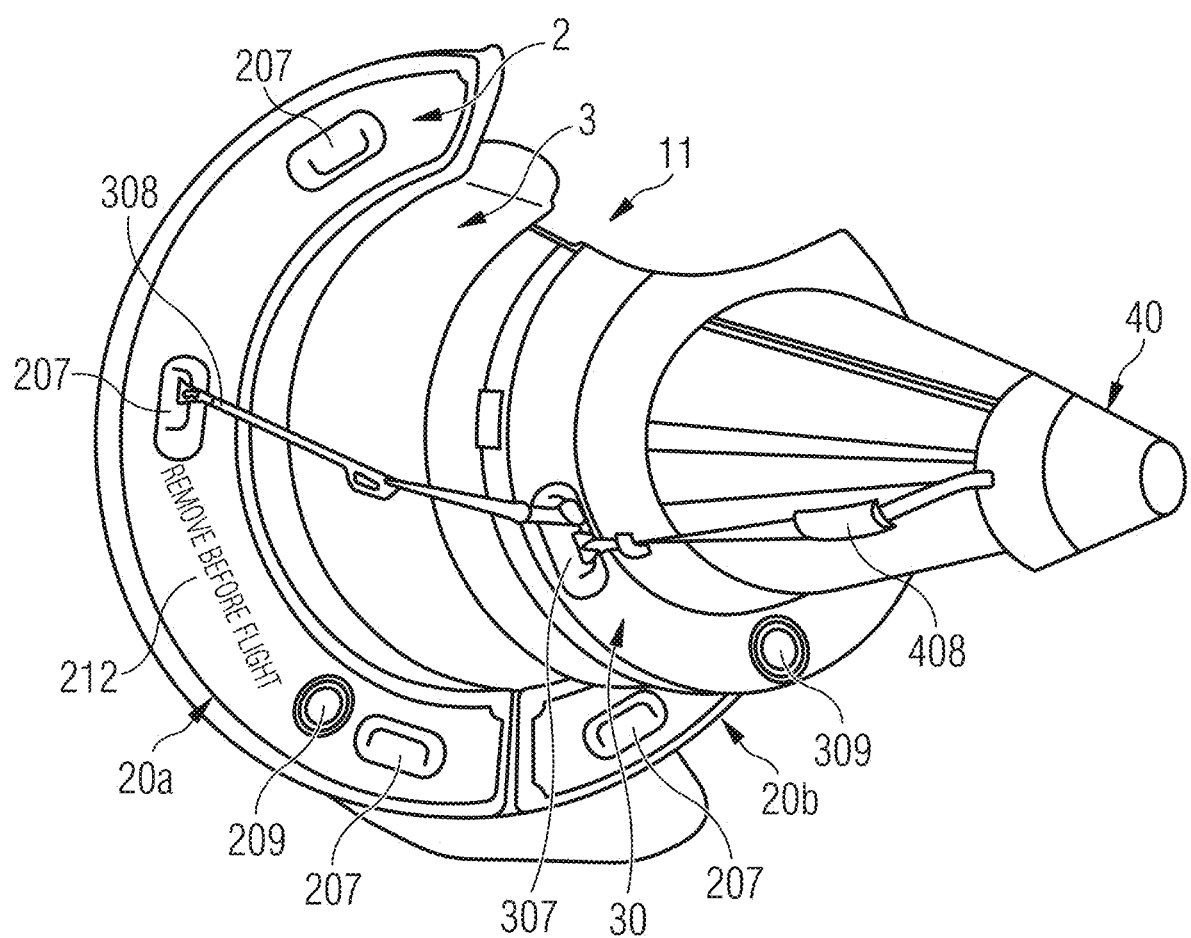
FIG. 7 shows a perspective view of an air exhaust cover being installed at an air exhaust of an engine according to a preferred embodiment of the disclosure herein.

FIG. 7 illustrates an example air exhaust 11 of an example engine 3 being sealed with an air exhaust cover 2 existing of the two C-ducts cover parts 20a, 20b being press fitted into the corresponding C-ducts of the engine 3, the exhaust nozzle cover 30 being press fitted into the corresponding exhaust nozzle of the engine 3 and the nozzle end cap 40 being placed of the end nozzle of the corresponding engine 3.

As illustrated in FIG. 7, the exhaust nozzle cover 30 is connected to middle handles 207 of the C-ducts cover parts 20a, 20b by safety belts 308 in order to hold the exhaust nozzle cover 30 into a stable position. The nozzle end cap 40 is analogue secured by at least one safety belt 308 to the exhaust nozzle cover 30, wherein advantageously the middle handles 307 of the exhaust nozzle cover 30 are used for attaching the safety belt 408 of the nozzle end cap 40 to exhaust nozzle cover 30. Preferably, for these attachments of the safety belts 308 and 408 the respective handles 207, 307 being positioned in the respective horizontal center lines are used as an attachment structure for an upmost stable attachment.

During an installation process, the two C-ducts cover parts 20a, 20b are placed and aligned into the respective C-ducts of the engine 3 and inflated partly in order to press fit and to position them correctly. Afterwards, in case a predetermined position is achieved, the two C-ducts cover parts 20a, 20b are inflated to their full extend. Afterwards, the same is conducted with the exhaust nozzle cover 30 being inflated and press fitted into the corresponding exhaust nozzle of the engine 3. Afterwards, the safety belts 308 are attached to the respective handles 207 and 307 to secure the cover parts to each other. Finally, the nozzle end cap 40 is being placed over the end nozzle of the engine 3 and secured by the safety belt 408, also using the middle handles 307 of the exhaust nozzle cover 30.

In the proceeding detailed description, various features have been combined in one or more examples in order to improve the cogency of the illustration. However, it should be clear that the above description is merely illustrative but in no way restrictive in nature. It serves to cover all the alternatives, modifications and equivalents of the various features and embodiment examples. Many other examples will be immediately and directly clear to a person skilled in the art based on their expert knowledge in view of the above description.

The embodiment examples have been chosen and described to enable the principles underlying the disclosure herein and their possible uses in practice to be illustrated as well as possible. This will enable those skilled in the art to modify and use the disclosure herein and its various embodiment examples in an optimum way in respect of the intended purpose. In the claims and the description, the terms "containing" and "having" are used as linguistically neutral concepts for the corresponding term "comprising". Furthermore, use of the terms "a" and "an" is not intended, in principle, to exclude a plurality of features and components described in this way.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

| LIST OF REFERENCE SIGNS | |
| --- | --- |
| 1 | air intake cover |
| 2 | air exhaust cover |
| 3 | engine |
| 10 | air intake |
| 11 | air exhaust |
| 20a, 20b | C-ducts cover parts |
| 30 | exhaust nozzle cover |
| 40 | nozzle end cap |
| 100 | access opening |
| 101 | hatch |
| 102 | through passage |
| 103 | connector |
| 104 | friction protector |
| 105 | carrying device |
| 106 | resistant bottom |
| 107 | handle |
| 108 | safety line |
| 109 | valve |
| 110 | distance position flap |
| 111 | reinforcement patch layer |
| 112 | information labelling |
| 113 | pocket |
| 201 | positioning marking |
| 207 | handle |
| 209 | valve |
| 212 | information labelling |
| 307 | handle |
| 308 | safety belt |
| 309 | valve |
| 310 | distance position flap |
| 312 | information labelling |
| 408 | safety belt |

The invention claimed is:

1. An engine protection cover device for airtight sealing an engine of an aircraft or spacecraft, the engine protection cover device comprising:
   an air intake cover that is inflatable to correspond to an internal dimension of an air intake for airtight sealing, the air intake cover comprising an airtight sealable access opening for attaching or passing through an air dryer for drying air inside the engine; and
   an air exhaust cover.

2. The engine protection cover device according to claim 1, wherein:
   the access opening is airtight sealable by a corresponding airtight sealing hatch, lid, or flap; or
   the access opening comprises a connector for connecting a tube of the air dryer or of an active humidity controller, wherein the connector is configured as a bayonet lock.

3. The engine protection cover device according to claim 1, wherein the air intake cover comprises a friction protector at an outside of the air intake cover in a vicinity of and/or below the access opening, the friction protector being positioned and configured for protecting a surface of the engine and/or of the air intake cover against friction damage due to contact with a tube of the air dryer that is attached to or passes through the access opening.

4. The engine protection cover device according to claim 3, wherein the friction protector is a neoprene flap or carpet.

5. The engine protection cover device according to claim 1, wherein the air intake cover comprises a carrying device or a mesh bag that is respectively positioned at a backside of the air intake cover behind the access opening for carrying an inserted air dryer or desiccant.

6. The engine protection cover device according to claim 5, wherein the mesh bag comprises a continuous and resistant bottom for carrying the air dryer or desiccant without coming into direct contact with parts of the engine.

7. The engine protection cover device according to claim 1, wherein the air intake cover comprises:
    several handles for correctly handling and positioning of the air intake cover, wherein two handles are positioned about at a horizontal center line symmetrical to each other; or
    the air intake cover comprises at least one safety line or safety pin strap for attaching the air intake cover to the engine, wherein the at least one safety line or safety pin strap can be stored during non-use in a respective stow and/or protection device provided at a front side of the air intake cover.

8. The engine protection cover device according to claim 1, wherein the air exhaust cover comprises a C-ducts cover, an exhaust nozzle cover, and/or a nozzle end cap.

9. The engine protection cover device according to claim 8, wherein the C-ducts cover comprises two C-ducts cover parts that are inflatable to correspond to internal dimensions of two engine C-ducts, respectively, for airtight sealing.

10. The engine protection cover device according to claim 9, wherein:
    each of the two C-ducts cover parts comprises one or more handles at predetermined areas thereof or at an upper area, in an area of a horizontal center line, or a lower area; and
    the exhaust nozzle cover comprises one or more handles at predetermined areas thereof or at an upper area, in an area of a horizontal center line, or a lower area.

11. The engine protection cover device according to claim 9, wherein the two C-ducts cover parts comprise an interface press fit in upper and/or lower interface areas between the two C-ducts cover parts to provide a closed configuration, wherein optionally an additional moisture barrier is provided at the lower interface area of the two C-ducts cover parts.

12. The engine protection cover device according to claim 8, wherein the exhaust nozzle cover is inflatable to correspond to internal dimensions of the engine nozzle for airtight sealing when the exhaust nozzle cover is inflated.

13. The engine protection cover device according to claim 8, wherein the nozzle end cap is made of a PVC or other material and is attached to the exhaust nozzle cover by at least one safety belt, or by two safety belts being positioned about at a horizontal center line thereof.

14. The engine protection cover device according to claim 8, wherein the air intake cover, the C-ducts cover, and/or the exhaust nozzle cover comprise a valve, or a safety relief valve, at a front side thereof, respectively.

15. The engine protection cover device according to claim 8, wherein:
    the air intake cover comprises one or more distance positioning indicator markings or flaps that are positioned at a peripheral area thereof; and/or
    the air exhaust cover comprises one or more distance positioning indicator markings or flaps that are positioned at a peripheral area thereof.

16. The engine protection cover device according to claim 8, wherein:
    the air intake cover comprises at least one additional reinforcement layer, patch, and/or material at a predetermined location on a backside of the air intake cover for protecting the air intake cover against damage during contact with the engine;
    the air exhaust cover comprises at least one additional reinforcement layer, patch, and/or material at a predetermined location on a backside of the air intake cover for protecting the air exhaust cover against damage during contact with the engine.

17. The engine protection cover device according to claim 1, wherein:
    the air intake cover comprises, on a front side thereof, an information labelling, a caution sign, an engine type labelling, a position marking, and/or an introduction marking; and/or
    the air exhaust cover comprises, on a front side thereof, an information labelling, a caution sign, an engine type labelling, a position marking, and/or an introduction marking.

18. An aircraft or spacecraft comprising the engine protection cover device according to claim 1.

19. An engine protection cover device for airtight sealing an engine of an aircraft or spacecraft, the engine protection cover device comprising:
    an air intake cover that is inflatable to correspond to an internal dimension of an air intake for airtight sealing, the air intake cover comprising:
        an airtight sealable access opening for attaching or passing through an air dryer for drying air inside the engine; and
        a friction protector at an outside of the air intake cover in a vicinity of and/or below the access opening, the friction protector being positioned and configured for protecting a surface of the engine and/or of the air intake cover against friction damage due to contact with a tube of the air dryer that is attached to or passes through the access opening.

20. The engine protection cover device according to claim 19, wherein the friction protector is a neoprene flap or carpet.

* * * * *